Oct. 17, 1967 J. J. DOYLE ET AL 3,347,990

STOCK QUOTATION SWITCHING SYSTEM UTILIZING CALLING RATE DETECTION MEANS

Filed Dec. 24, 1963 9 Sheets-Sheet 1

INVENTORS J. J. DOYLE
A. J. SARKA
F. C. TANCREDI
BY A. C. Winter
ATTORNEY

Oct. 17, 1967 J. J. DOYLE ET AL 3,347,990

STOCK QUOTATION SWITCHING SYSTEM UTILIZING CALLING RATE DETECTION MEANS

Filed Dec. 24, 1963 9 Sheets-Sheet 6

Oct. 17, 1967 J. J. DOYLE ET AL 3,347,990

STOCK QUOTATION SWITCHING SYSTEM UTILIZING CALLING RATE DETECTION MEANS

Filed Dec. 24, 1963 9 Sheets-Sheet 8

3,347,990

STOCK QUOTATION SWITCHING SYSTEM UTILIZING CALLING RATE DETECTION MEANS

James J. Doyle, Suffern, August J. Sarka, Baldwin, and Frederick C. Tancredi, White Plains, N.Y., assignors to American Telephone and Telegraph Company, New York, N.Y., a corporation of New York Filed Dec. 24, 1963, Ser. No. 333,001

13 Claims. (Cl. 179—6)

ABSTRACT OF THE DISCLOSURE

An announcement system employing overlap operation of a register and trunk pair, with an audible announcement from a central memory store being returned via the trunk in response to the reception of an address code from one subscriber, simultaneously with the recording in the paired register of an address code from another subscriber. Each register and the associated trunk are controlled by a switching circuit which is operative to respond to increases and decreases in the calling rate and to vary the amount of information transmitted through the system in response thereto.

Figure 1:
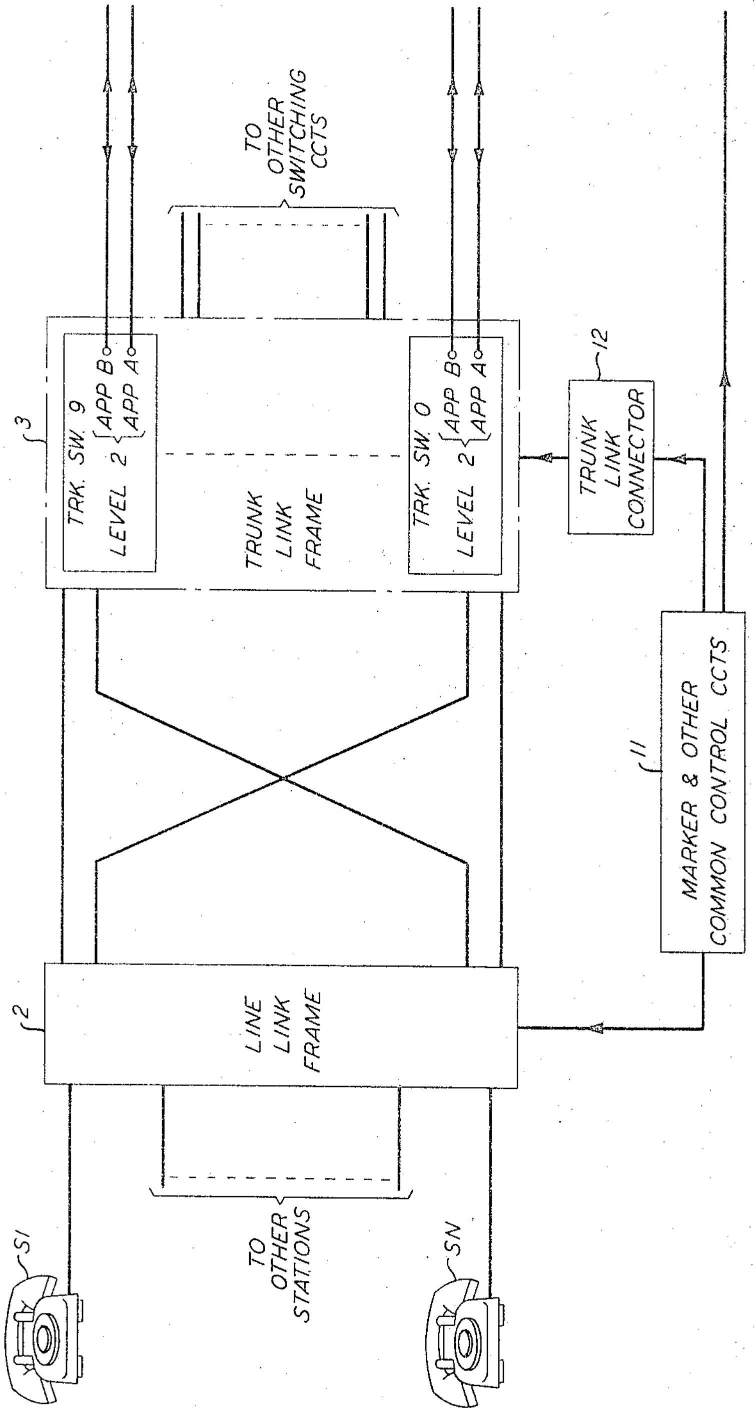

This invention relates generally to automatic switching systems operable to complete calling connections which are characterized by a high calling rate and relatively uniform holding time. The invention particularly relates to switching equipment in such systems which automatically transfers a channel, over which control signals have been received, from a signal receiving device to an associated trunk circuit over which information is transmitted in response to such signals, and thereupon associates the signal receiving device with another channel whereupon the same procedure may be repeated.

Extensive development and improvement of telephone switching systems in recent years has resulted in greater reliance being placed upon the ability of such systems to facilitate the everyday business needs of telephone customers. In this regard, seemingly unrelated expansion in another field quite often leads to demand for an improved switching system. Almost inevitably, two main factors lead the requirements for such improvement; namely, increased speed of operation and continued economy of implementation.

In the past decade there has been a significant increase in participation by the public in the purchase and sale of securities on the various stock exchanges. Concurrent therewith, in keeping with an expanding economy, there has been a significant increase in the number and type of securities offered by such exchanges. A natural result of these two factors has been an increase in the number of stockbrokers, who function as the intermediaries between the buyers and sellers of the securities offered on the various exchanges. In their capacity as intermediaries it is necessary for such brokers to have immediate and accurate price information regarding commodities which in many instances fluctuate widely and frequently in price during the course of a business day.

Telephone stock-quotation systems have been provided in the past to enable such brokers to dial a predetermined code and receive in response thereto an audible announcement stating the pertinent price information for a specific stock as identified by the dialed code. Simply stated, such systems comprise a subscriber controlled switching network operable to connect such subscribers with voice-answer-back equipment.

It will be noted that the traffic through such a switching system differs from conventional telephone traffic in many aspects. For example, in the usual telephone switching system, traffic is distributed over a 24-hour period with relatively brief "busy hour" peaks. In addition, each connection is maintained after establishment for a period averaging several minutes in duraton. However, in the case of stock quotation systems all traffic is concentrated within the business day. Further, in stock quotation systems, an established connection is maintained only long enough to receive the required information, a matter of perhaps five to ten seconds. Therefore, when these factors are added to a situation comprising an expanding number of brokers, an expanding number of stocks, and a higher calling rate based upon large volume, it is clear that improved system arrangements must be provided which are operative to meet such requirements.

It is, of course, obvious that an arrangement which satisfies the need in stock quotation systems would also be applicable to other systems having similar requirements, such as those which provide secretarial answering service, airline reservation service, time of day service and weather information service.

In copending application Ser. No. 333,000, filed Dec. 24, 1963, of G. Riddell, there is described a switching arrangement which is effective to increase the traffic handling capacity of a switching system without increasing the complexity of the associated control equipment. In the Riddell system the speed at which connections are established is increased by utilizing the trunk and register equipment simultaneously on independent connections.

More specifically the system described in the Riddell application comprises a stock quotation system wherein a privileged broker, by dialing an appropriate code, is enabled to interrogate a computer which, in turn, controls a voice-answer-back unit operable to return an audible manifestation of the required stock information. Each of the privileged stations is terminated on the originating side of a switching network, and has immediate access to a plurality of registers which appear on the terminating side of the network. The registers are operable to receive and register the stock identifying code transmitted from the station, and each register is paired with an associated trunk unit operable to convey the audible stock announcement from the computer to the station. A switching circuit is interposed between each trunk-register pair and a pair of switching network appearances on the terminating side of the switching network. The trunk and register in a pair are each individually connected through the switching circuit to one of the appearances.

Upon a request for service from a privileged station, a connection is established through a switching circuit to an idle register associated therewith. When dialing is completed, the register forwards the dialed information to a sender which, in turn, activates the computer. The computer assembles the required information, and having done so, signals the switching circuit via the trunk associated with the register serving the call.

The switching circuit thereupon automatically connects the trunk exclusively to the switching network appearance used for the connection to the register, and concurrently therewith connects the register exclusively to the other appearance of the switching circuit formerly associated with the trunk. The register is thereupon available to receive another dialed code during the interval that an audible announcement is being returned via the associated trunk.

Upon completion of the announcement via the trunk, the register forwards a newly dialed code contained therein as on the previous connection so as to cause the assembly of the required stock data in the computer. And, as on the previous connection, upon receipt of a signal from the computer, the switching circuit causes the trunk to be connected to the appearance used for the latest dial tone connection while the register is reassociated with the appearance formerly connected to the trunk.

Thus, when the register of any register-trunk pair has completed its function, it is immediately utilized to serve another call. In like fashion, when the trunk completes its function, it too becomes immediately available to serve another call. Therefore, during the heavy traffic of the business day, both component halves of a trunk-register unit are simultaneously operating to process calls which progress in opposing directions; i.e., the register is receiving control information from one station while the trunk is returning audible information to another station.

As hereinbefore discussed, broker stations require information as to the current status of a particular stock in terms of the bid and asked price. In stock quotation systems, the provision of this information may thus be considered mandatory. Accordingly, a system arranged to provide this information during the heavy traffic periods of the business day is satisfactory since it is operative to meet the customers' need.

In stock quotation systems, however, auxiliary information, such as the high for the day, low for the day, etc., while not mandatory, would be beneficial to interested brokers. Obviously, a system which provided both mandatory and auxiliary information at all times would result in longer equipment holding time and consequently a more expensive system. However, during periods of less than peak traffic, a percentage of register-trunk units are idle. Therefore, a more efficient stock quotation system results in an arrangement whereby upon the occurrence of a light traffic situation, an audible message including both mandatory and auxiliary information is provided to calling stations. However, merely increasing trunk holding time in this manner results in an imbalance, since the associated register work time remains unchanged because the same number of stock identifying digits are dialed in each instance. Accordingly, in a system employing paired trunk-register units where a register begins receiving dialed digits at a point in time when the associated trunk begins transmission of a long interval message, the privileged station is required to wait a longer period of time than normal for return of the requested message, thereby increasing the occurrence of abandoned calls, repeated calls, etc.

In view of the foregoing, a need exists for a stock quotation system employing paired trunk-register operation wherein light traffic periods are utilized to provide additional information to calling stations without changing the trunk to register holding time ratio.

Accordingly, it is an object of this invention to provide a switching arrangement which is effective to increase the information output capacity of a switching system without increasing the quantity or complexity of existing control equipment.

It is another object of this invention to increase the flexibility of a switching system so as to enable the system to respond most efficiently to varying demands for service.

These and other objects of the invention are attained in accordance with the exemplary embodiment as hereinbefore described, further supplemented by a traffic control circuit operative to record the onset of a light traffic period in the switching system as manifested by a decreased calling rate. The traffic control circuit is arranged to thereupon signal the message-assembling equipment that auxiliary information in predetermined categories may be added to subsequently assembled messages.

Each register is provided with a relay operative in response to the enabled condition of the associated trunk and a continuing light traffic signal from the traffic control circuit. The enabling of this relay prevents the subsequent seizure of the register for a predetermined interval of time as determined by a timing circuit controlled by the relay. At the end of the time interval the relay is released, thereby rendering the register available for immediate seizure.

The time interval thus artificially equalizes the register and trunk holding time by delaying seizure of the register until a predetermined portion of the trunk work time has elapsed.

Upon the onset of a heavy traffic interval, the traffic control circuit removes the light traffic signal from all registers thereby disabling each of the aforesaid relays and associated timing circuits. The system thereupon returns to heavy traffic operation as hereinbefore set forth.

Subsequent decreases and increases in station calling rate correspondingly enable and disable the traffic control circuit at various times during the business day thereby permitting the information output of the system to reach the most efficient overall maximum as determined by the equipment provided.

In accordance with one feature of our invention a switching system is provided with a traffic control circuit operative to respond to increases and decreases in calling rate and to vary the amount of information transmitted through the system in response thereto so as to increase the information provided per call during light traffic and to decrease the information provided per call during heavy traffic.

In accordance with another feature of the invention a switching system employing paired trunk-register operation is provided with a traffic control circuit operative to detect periods of light traffic and to thereupon increase the trunk work time without disturbing the normal trunk to register holding time ratio.

Figures 2, 10:
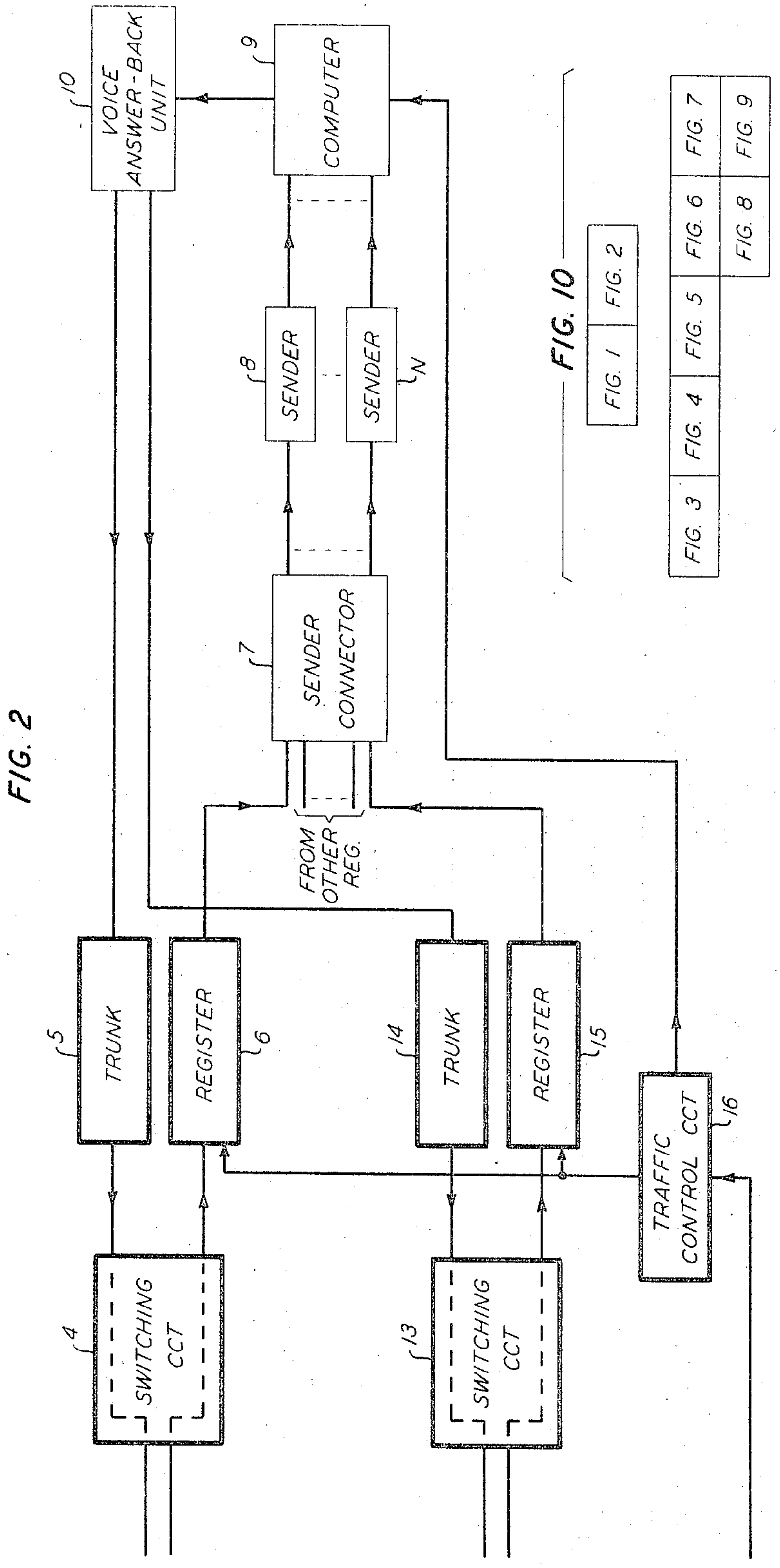

The foregoing objects and features, as well as others, will be more apparent from a consideration of the subsequent description and the drawing, in which:

FIGS. 1 and 2 comprise a block diagram showing the interrelation of the components of the exemplary embodiment;

FIGS. 3 through 9 show in greater detail the interrelation of the components of the exemplary embodiment; and FIG. 10 depicts the position in which the various figures should be placed.

It will be noted that FIGS. 3 through 9 employ a type of notation referred to as "detached-contact" in which an "X," shown intersecting a conductor, represents a normally open contact of a relay, and a bar, shown intersecting a conductor at right angles, represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

The present invention may advantageously be embodied in an automatic switching system such as the system disclosed in the A. J. Busch Patent No. 2,585,904, dated Feb. 19, 1952. It is to be understood, however, that the invention is not limited to use in a system of this type, but may be used in any automatic switching system.

The invention described herein is particularly concerned with apparatus in switching circuits 4 and 13, trunks 5 and 14, registers 6 and 15, and traffic control circuit 16 which are represented by the blocks shown with heavy lines in FIG. 2. The other equipment units are neither shown nor described in detail except where necessary for a complete understanding of the invention.

Computer 9 may be of a type well known in the art which is operative to receive and store numerous bits of information in response to externally applied electrical stimuli and is further operative to provide such stored information electrically upon request. Such computers are discussed in numerous publications; for example, in the "General Information Manual Introduction to IBM Data Processing Systems," 1960, by International Business Machines Corporation.

Voice-answer-back unit 10 may comprise any number of configurations well known in the art which are operative to return a sequence of audio signals in response to electrical signals; for example, the arrangement described and illustrated in detail in the Malthaner et al. Patent No. 2,951,908, dated Sept. 6, 1960, may be utilized.

The Busch patent may be consulted for a complete understanding of the construction and operation of all the other components which are not covered in detail herein.

The interrelation and functions of equipment units of the exemplary embodiment will now be described with reference to FIGS. 1 and 2 wherein the interconnections between circuit blocks have been designated by means of arrows to show the direction of circuit action. The equipment and the operation thereof during the heavy traffic periods are as set forth in the above-mentioned G. Riddell application Ser. No. 333,000, filed Dec. 24, 1963.

(1) GENERAL DESCRIPTION (FIGS. 1 AND 2)

For purpose of explanation, we shall assume stations S1 through SN comprise a plurality of privileged stations, all of which are terminated on line link frame 2. It will be clear from that which is contained hereinafter that line link frame 2 is not necessarily restricted to the termination of such privileged stations, but could, in fact, also terminate conventional subscriber lines. It will also be apparent from that which is contained hereinafter that the privileged stations are not restricted to being terminated on a particular line link frame, but rather could, in fact, have their terminations distributed over a plurality of line link frames as dictated by traffic considerations.

We shall assume that a broker at station S1 desires to ascertain the current status of a given stock listed on the Exchange. Upon an off-hook condition of station S1, a dial tone connection is established from station S1 through to an available register, such as register 6, as set forth in detail in the A. J. Busch patent.

As shown on FIG. 1, register 6 appears initially on appearance A, level 2, trunk switch 9. Thus, the crossbar switch channel linkage is extended between the station S1 appearance on line link frame 2 and the above-recited appearance of register 6 on trunk link frame 3.

Upon the receipt of dial tone, a predetermined code which may, for example, comprise four arbitrary digits, is dialed and recorded in register 6. Upon registration of the fourth digit, register 6 recognizes that a complete code identifying a particular stock has been dialed. Register 6 thereupon seizes an available sender, such as sender 8, via sender connector 7. Register 6 then forwards the received four digit stock code and, in addition, forwards a three digit number identifying the trunk with which register 6 is associated, namely trunk 5.

Upon receiving the trunk number and the four digit code, sender 8 forwards this information to computer 9. Computer 9 thereupon processes the request by utilizing the four digit stock number to read out from its memory the information indicating the current status of the stock. The trunk number is used by the computer to cause selection of a corresponding output channel from voice-answer-back unit 10 to trunk 5.

The information received from the computer memory is used to control the voice-answer-back unit, so as to cause the return of an audible announcement via the selected output channel. The audible announcement will indicate, for example, the bid and asked price for the stock. However, immediately prior to enabling the audible announcement, a signal is forwarded over the trunk conductors to switching circuit 4. Switching circuit 4 recognizes from this signal that the computer has received and processed a stock code request and is ready to provide an audible announcement in response thereto. Switching circuit 4 thereupon causes trunk 5 to be transferred from its existing association with appearance B, level 2 of trunk switch 9, to appearance A on the same level; and concurrently therewith to cause register 6 to be transferred from its connection to appearance A to appearance B, formerly associated with trunk 5. Upon the completion of this transfer function, the audible announcement is returned through trunk 5 and over the channel linkage previously used for the dial tone connection to station S1.

Register 6 in its new association with appearance B is rendered immediately available for use on a dial tone connection to another station. Thus, while the audible announcement is being returned to station S1 via trunk 5, register 6 may be recording another dialed request for stock information.

Upon registration of the dialed code associated with a new request, such as a request from station SN, register 6 bids for a sender in the same fashion as for the prior request from station S1. However, as will be more apparent hereinafter, such connection to a sender is not begun until trunk 5 has completed its function with respect to station S1.

It will be noted at this point that, in general, the interval of time required for an audible announcement stating the bid and asked price is approximately equal to the interval of time required to dial and register four digits. Thus, in practice no time delay of any significance occurs between registration of the dialed stock code and the forwarding of this information to the sender.

Upon receipt of the dialed code information transmitted by station SN, computer 9 processes the information as for the prior call and, as before, switching circuit 4 is advised when the computer is ready to return the audible announcement. Trunk 5 is thereupon reassociated with appearance B, and register 6 is reassociated with appearance A. Therefore, an announcement via trunk 5 may again occur while register 6 receives dialed digits identifying another request. Consequently, during the heavy traffic periods of the business day, both component halves of a trunk-register unit are simultaneously operating to process respective calls which progress in opposing directions.

The immediately preceding general description assumes the existence of a heavy traffic condition in the switching system—i.e., a high calling rate during a predetermined period of time. While such condition will be most common, there will of course be periods of relatively light traffic interspersed with the periods of heavy traffic.

As will be more apparent from that which is contained hereinafter, the onset of a light traffic period is indicated to traffic control circuit 16 by marker 11. It may be noted at this time that while for purpose of explanation marker circuit 11 is shown as detecting a change of traffic condition, in fact, any other of the common circuits of the system may be so arranged. For example, computer 9 could advantageously be utilized for this purpose.

Upon being advised of a light traffic condition, traffic control circuit 16 signals each register. As will be more apparent hereinafter, the receipt of this signal enables inhibiting means in each register which delays the seizure of the register until the associated trunk has had a voice message impressed thereon for a predetermined period.

Traffic control circuit 16 also signals computer 9 that subsequently assembled messages shall comprise information in predetermined categories beyond that which is normally provided during a heavy traffic condition.

Therefore during light traffic intervals, a message containing more information is impressed on each trunk. Concurrent therewith, inhibiting means are effective in each register to prevent seizure thereof until the message has been impressed on the associated trunk for a predetermined period of time. In this fashion, the register to trunk work-time ratio is effectively maintained while an increased information output is provided during periods of light traffic.

When heavy traffic is again encountered, traffic control circuit 16 cancels the long message feature and system operation progresses as hereinbefore described.

(2) DETAILED DESCRIPTION

The manner in which marker 11 functions to establish a dial tone connection between a station appearing on line link frame 2 and a register appearing on trunk link frame 3 is exactly as set forth in detail in the A. J. Busch patent. Accordingly, that portion of the Busch patent, namely, column 6 through column 61, is hereby made a part of this specification as though contained in detail herein.

In order to simplify the drawings, certain relays and relay contact designations have been enclosed by parentheses in order to indicate that the associated relay winding operate path is shown in detail on the aforesaid Busch patent drawings and is not repeated herein.

Figure 3:
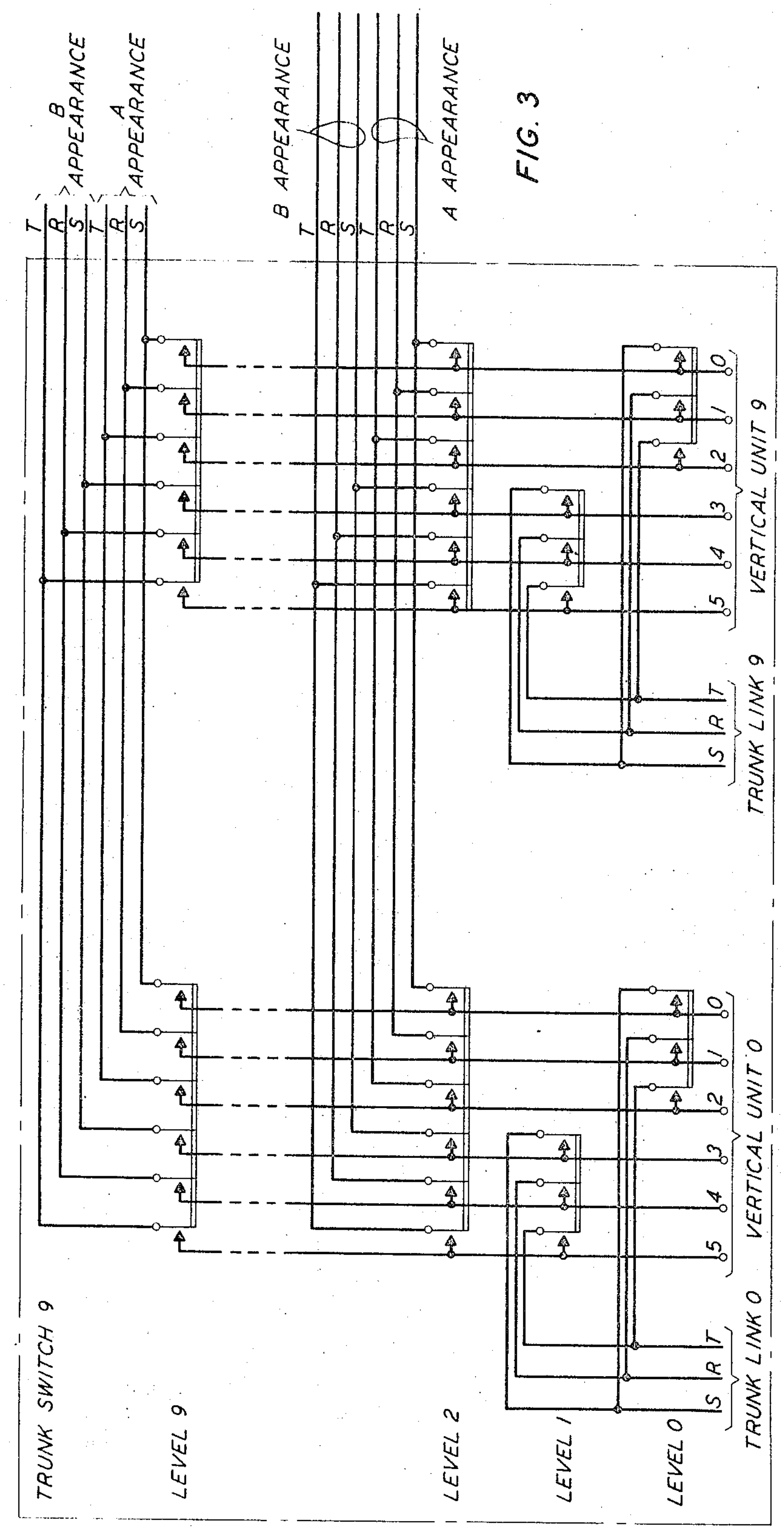
Figure 4:
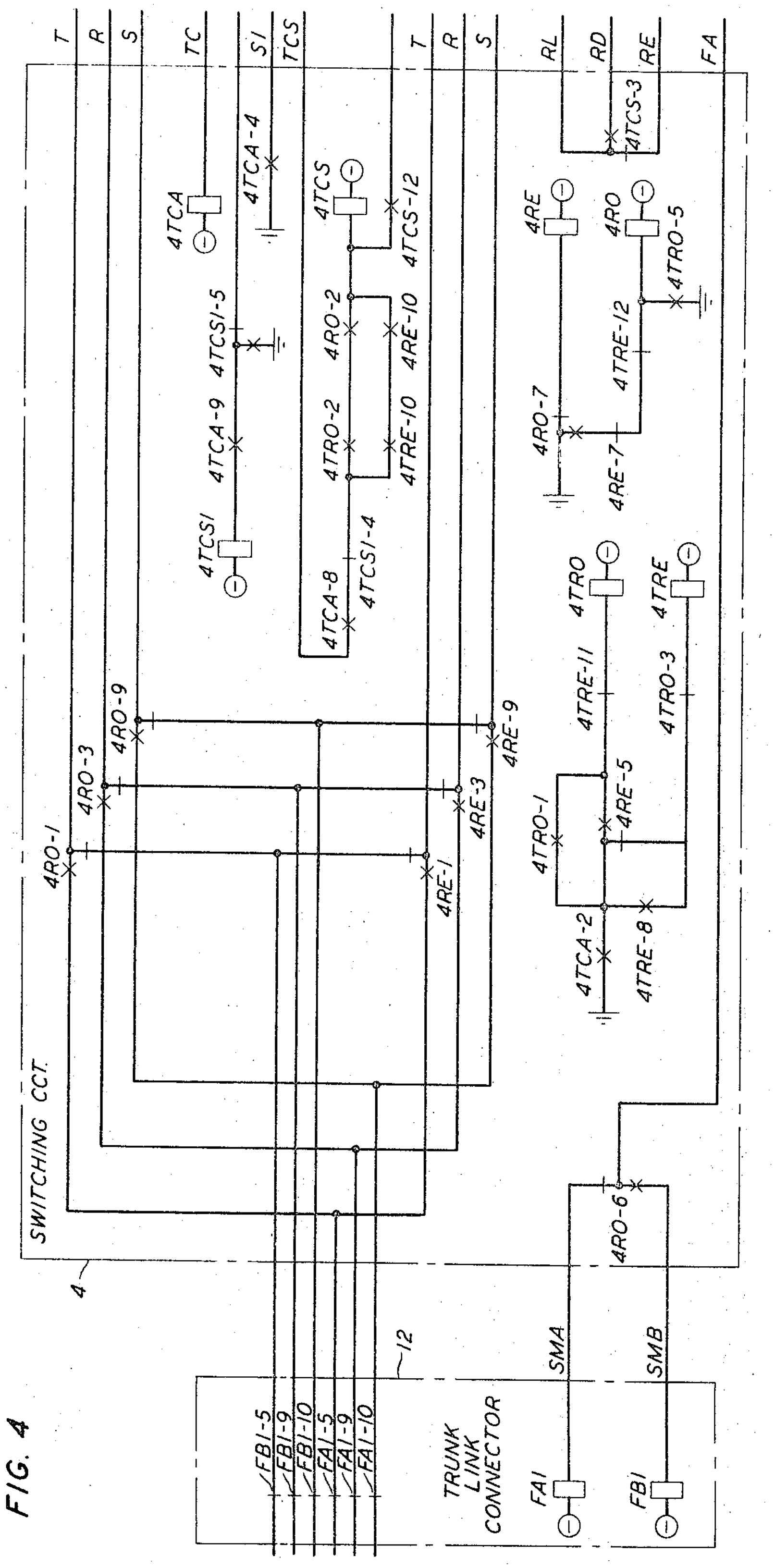

Referring briefly to FIG. 3, it will be noted that trunk switch 9 is arranged as described in the Busch patent so as to terminate a total of 16 registers or trunk circuits. This is accomplished by subdividing each of the trunk switch levels 2 through 9 into distinct A and B appearances wherein each appearance terminates a separate circuit. Each such circuit is then connectable to a given trunk link by the closure of two crosspoints in the same trunk switch vertical unit, i.e., a crosspoint at either level "0" or level "1" plus a crosspoint at one of levels 2 through 9.

This arrangement of providing an A and a B appearance for a particular switch level may advantageously be utilized to facilitate an explanation of one embodiment of the invention. However, it will be apparent from the following description that the invention is not dependent on such an arrangement.

(2.1) *Establishing the dial tone connection*

Referring now to FIGS. 3 through 7, it will be recalled, as set forth in detail beginning in column 9 of the Busch patent, that an operated FA1 or FB1 relay in the trunk link connector 12, determines the A or B appearance, respectively, to be used on a given connection. Upon selection of register 6 by marker 11, relay 8F is operated in register 6 as set forth beginning in column 28 of the Busch patent. Ground is thereupon extended through contact 8F–5, FIG. 5, over the FA lead from register 6 to switching circuit 4, and thence through break contact 4RO–6 released, via the SMA lead so as to operate relay FA1 in trunk link connector 12. Relay FA1 accordingly operates at this time and, as set forth in the Busch patent, subsequently causes the enabling of the A appearance of level 2 on trunk switch 9.

When channel selection for the dial tone connection has been completed and the marker is ready to turn supervision of the connection over to register 6, as set forth in column 56 of the Busch patent, relay 8F is caused to release in register 6. Accordingly, relay FA1 releases by an obvious circuit thereby extending the T, R, and S leads from the A appearance on trunk switch 9, level 2, through break contacts FA1–5, FA1–9, and FA1–10, respectively, to switching circuit 4. From switching circuit 4 these leads are extended through enabled transfer contacts 4RE–1, 4RE–3 and 4RE–9 to register 6 where the T and R conductors terminate in the secondary windings of transformer TN and the S conductor is extended through make contact 5ON–2 to ground.

At this point a dial tone connection has been completed comprising a communications channel extending from a calling station such as S1 through to register 6. Register 6 may advantageously be arranged similar to the originating register described in the Busch patent except as hereinafter noted.

Figure 5:
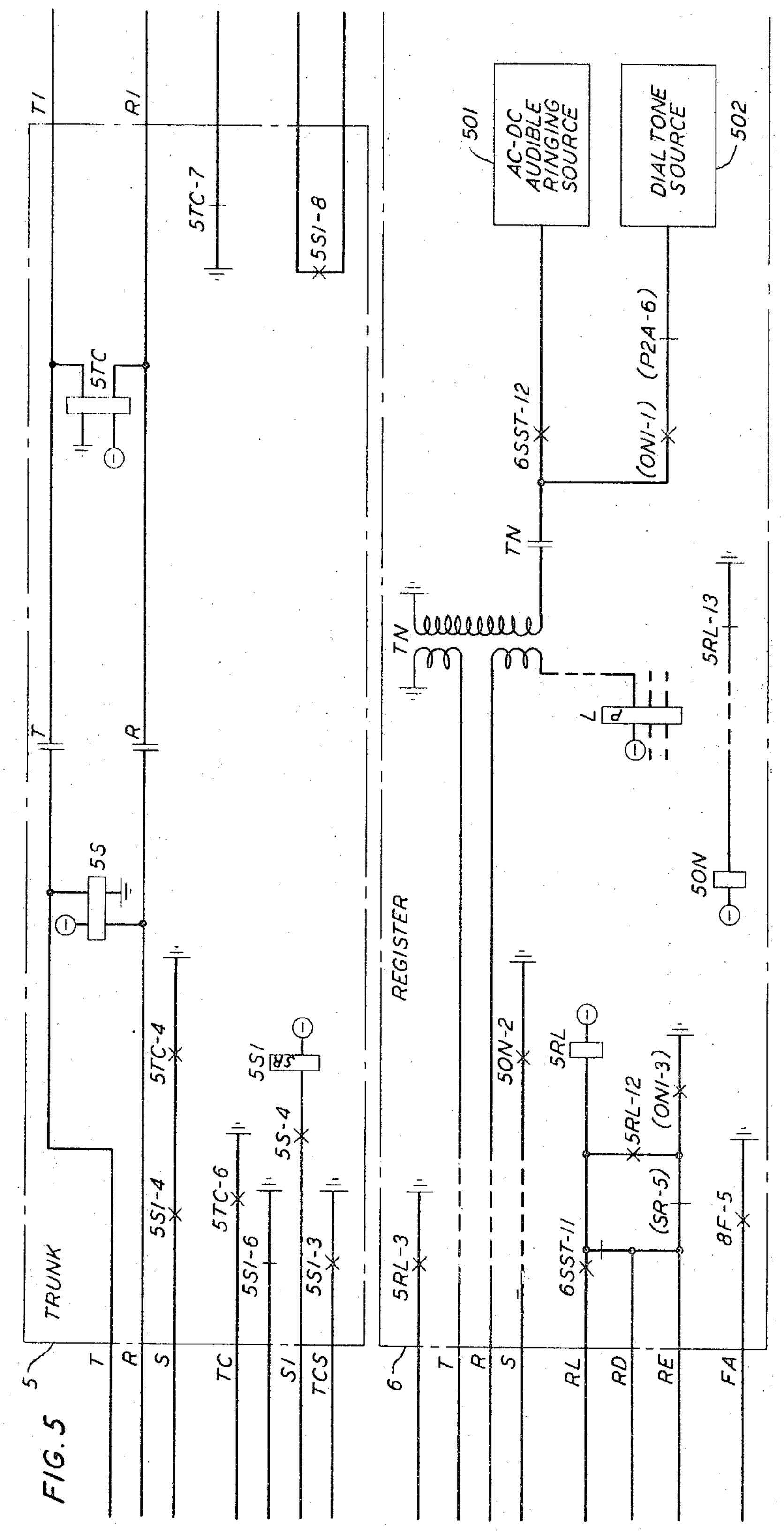
Figure 6:
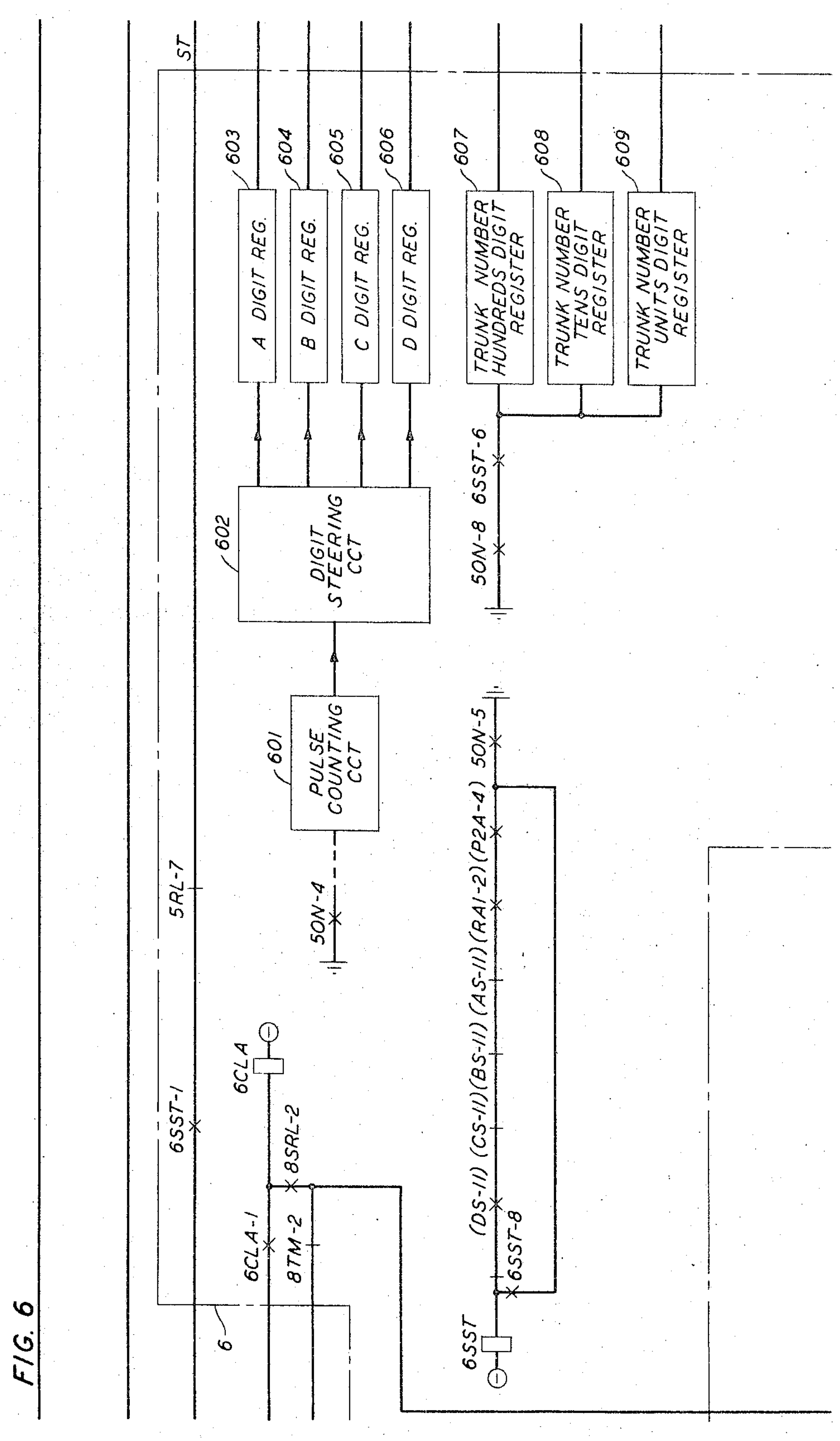

The enabling of make contact (ON1–1) and the released condition of (P2A–6) in register 6, FIG. 5, enables dial tone source 502 so as to impress dial tone through transformer TN on the T and R conductors of the A appearance.

(2.2) *Registration of information in register*

Upon the receipt of dial tone, the party at station S1 commences dialing. As set forth in the Busch patent, the dial pulses are repeated by register relay (L), FIG. 5, and are counted and stored by circuitry represented in FIG. 6 by pulse counting circuit 601, digit steering circuit 602, and A through D digit registers 603 through 606, respectively.

As described in detail in the Busch patent, at the completion of dialing of a fourth digit, relays (CS), (BS), and (AS) are in a released state and relays (DS), (RA1), (P2A) and 5ON are in an operated state. Accordingly, upon receipt of the fourth digit, relay 6SST operates via an obvious circuit comprising contacts on these relays as an indication that the required four digits identifying the stock have been received. Enabled make contact 6SST–12 enables audible ringing source 501 thus impressing a source of ringing tone on the primary winding of transformer TN as a signal to the calling station that the call is being completed. The enabling of make contact 6SST–6 extends positive ground present on the 5ON–8 contacts to the trunk number hundreds, tens, and units registers 607 through 609, respectively. Registers 607 through 609 may advantageously comprise a number of configurations well known in the art such that, upon application of a ground signal, a predetermined number will be manifested at the output on a two-out-of-five digital basis. In the instant case the particular hundreds, tens, and units numbers comprise the number 005 to indicate the identity of the trunk associated with register 6.

(2.3) *Seizure of sender*

The enabling of make contact 6SST–1 extends ground from released break contact 5TC–7 in trunk 5 through 5RL–7 released, via the ST lead, so as to operate the sender connector start relay 7RS6. Relay 7RS6 enables the sender connector relays (RD) and (MD) which may be advantageously be arranged and controlled in the same fashion as the correspondingly designated originating register marker connector relays described in detail in the Busch patent. Thus, upon the enabling of the (RD) and (MD) relays, a plurality of information and control leads are extended between register 6 and an available sender such as sender 8.

Sender 8 may be arranged, as well known in the art, to receive and register digital information from register 6 and to provide in response thereto a signal output compatible with the input apparatus arrangement of computer 9. Thus, the four digit code information from register 6 is registered on the A through D digit register 701 in sender 8. In similar fashion the trunk number hundreds, tens, and units register 702 in sender 8 records the assigned number of the trunk associated with register 6.

(2.4) *Enabling voice-answer-back unit 10*

Upon completion of registration in the sender, this information is translated as required by translator 703 and forwarded through signal transmitter 704 to input storage circuit 705 in computer 9. The information representing the dialed four digit stock code is thereupon utilized by memory read control circuit 706 to read from stock information memory circuit 707 the required data which then is temporarily stored in memory output storage circuit 708.

(2.5) *Seizing the trunk associated with register*

The three digit trunk number enables voice-answer-back output control circuit 709 to select the output channel in voice-answer-back unit 10 which corresponds to trunk 5.

Figure 7:
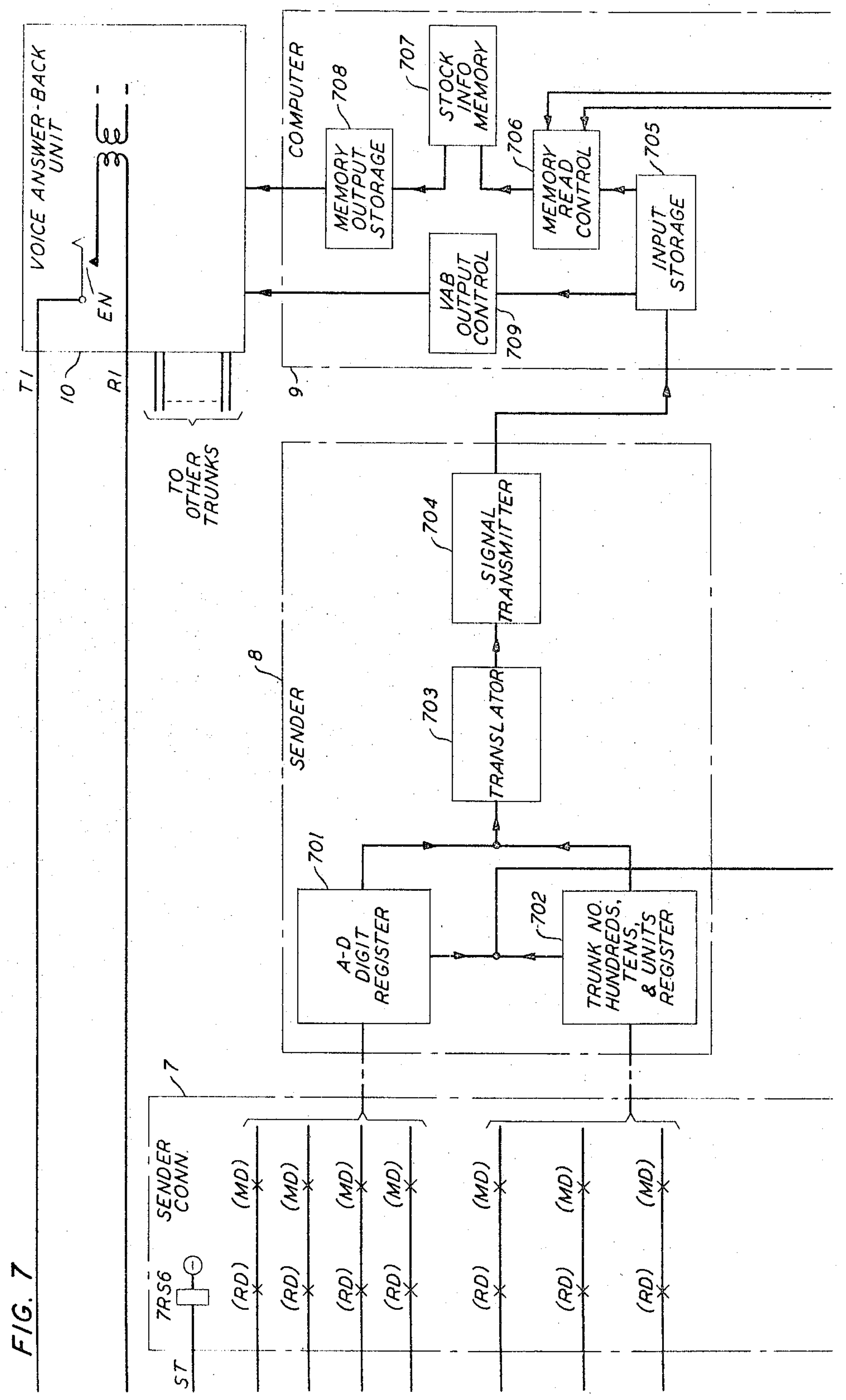

Upon selection of the appropriate output channel, as manifested by leads T1 and R1 in FIG. 7, voice-answer-back unit 10 enables trunk 5 by closing the T1 and R1 leads together in a manner well known in the art through apparatus symbolically represented by manually operable key EN. Accordingly, relay 5TC in trunk circuit 5 operates at this time by an obvious circuit.

(2.6) *Enabling switching circuit 4*

The operation of make contact 5TC–6 extends ground over the TC lead from the trunk to enable relay 4TCA in switching circuit 4. The operation of make contact 4TCA–2 enables relay 4TRO by extending ground through 4RE–5 operated, 4TRE–11 released, through the winding of the 4TRO relay to battery. Accordingly, relay 4TRO operates. The operation of make contacts 4TRO–5 thereupon operates relay 4RO by an obvious circuit. Enabled break contact 4RO–7 causes the release of the previously operated relay 4RE. It may be noted at this time that relays 4RE and 4RO control the connection of the register and trunk to the A and B appearances. It should be further noted that the operation of either relay inhibits the operation of the other.

The enabling of transfer contacts 4RO–1, 4RO–3, 4RO–9 transfer the trunk T, R, and S leads from the B appearance of level 2, trunk switch 9, to the A appearance of level 2 of trunk switch 9. Concurrently therewith, the release of transfer contacts 4RE–1, 4RE–3, and 4RE–9 transfer the T, R, and S conductors of register 6 from the A appearance of level 2, trunk switch 9, to the associated B appearance.

When the trunk T and R conductors are connected to the correspondingly designated conductors of the A appearance, relay 5S operates by a circuit which extends over the communications path to the calling station. Relay 5S1 operates at this time via a circuit which extends through 5S–4 and 4TCA–4 to ground. Ground is thereupon extended over the trunk S lead through 5S1–4 and 5TC–4 to maintain the communications channel as set forth in the Busch patent. The announcement from voice-answer-back unit 10 is thus transmitted to the customer at station S1 through trunk 5 via the linkage previously used for the dial tone connection.

(2.7) *Reseizure of register 6*

During periods of heavy traffic as will be more apparent hereinafter and concurrently with the start of the audible announcement via trunk 5, register 6 is rendered immediately available for reseizure via the B appearance of level 2, trunk switch 9.

Assuming that such subsequent seizure occurs, relay 8F is operated as hereinbefore described and extends ground via the FA lead from register 6 to switching circuit 4. However, since trunk 5 is currently associated with the A appearance, relay 4RO is enabled as previously described. Thus, the ground provided on the FA lead is extended so as to operate relay FB1 at this time. Accordingly, a dial tone connection is established to another station, such as station SN (FIG. 1), as hereinbefore described with the single exception that, by virtue of the operated state of relay FB1, such connection is established via the level 2 B appearance of trunk switch 9.

Dial tone is returned as before and, upon receipt of the stock-identifying digits and a trunk disconnect signal, a sender is seized. When the computer receives the required information from the sender, trunk 5 is enabled as described earlier.

The subsequent reoperation of relay 4TCA in switching circuit 4 operates relay 4TRE by a circuit path extending from ground through 4TCA–2 operated, 4RE–5 released, 4TRO–3 released, through the 4TRE relay winding to battery. Enabled break contact 4TRE–12 releases the previously operated relay 4RO by an obvious circuit. Relay 4RE is thereupon operated by a circuit extending to ground through 4RO–7 released. Relay 4TRE is subsequently released via normal make contact 4TCA–2 when the trunk restores to normal.

The release of relay 4RO reassociates the T, R, and S leads of trunk 5 with the trunk link frame B appearance via released break contacts 4RO–1, 4RO–3, and 4RO–9, respectively. In similar fashion enabled make contacts 4RE–1, 4RE–3, and 4RE–9 reassociate register 6 with the A appearance.

Thus, as on the previous call, the audible announcement is returned over trunk 5 via the appearance used for the dial tone connection. And, as described earlier, register 6 is again rendered available to serve another customer via the trunk link frame A appearance.

(2.8) *Release of the register*

Register release in the case of a partial dial or in the case of an abandoned call proceeds exactly as set forth in detail in the A. J. Busch patent. Assuming, however, that the call progresses through the register as hereinbefore described, when switching trunk 4 is enabled the register is caused to release. The register release relay 5RL is operated by negative battery which extends through the 5RL winding, through operated make contact 6SST–11, via the RL lead to switching circuit 4 operated make contact 4TCS–3, via the RD lead to register 6, through (SR–5) released, and (ON1–3) operated to ground. Relay 5RL thereupon locks operated by an obvious circuit which extends through make contact 5RL–12. The enabling of break contact 5RL–13 releases relay 5ON in register 6. The release of relay 5ON removes ground from the register S conductor and releases all other previous operated register relays as set forth in the Busch patent thereby restoring the register to normal.

(2.9) *Trunk release*

In the event that a customer abandons the call prior to completion of the audible announcement, relay 5S releases due to the opening of the loop toward the associated station. Relay 5S1 accordingly releases by an obvious circuit. The release of make contact 5S1–4 removes ground from the S conductor thereby restoring the channel linkage to normal as set forth in detail in the Busch patent. In similar fashion relay 4TCS is released by the release of make contacts 5S1–3.

When the announcement is completed, the T1 and R1 conductors from the voice-answer-back unit to the trunk are opened. Relay 5TC accordingly releases thereby restoring relay 4TCA to normal. Relay 4TCA, in turn, causes the release of relays 4TCS1 and either relay 4TRO or relay 4TRE. Accordingly, trunk 5 in switching circuit 4 is restored to normal. Only one relay in switching circuit 4 remains in an operated condition. This relay is either relay 4RE or 4RO depending upon which of these two relays is in an operated state at the time of the trunk release.

In the event the computer disconnects prior to abandonment of the call by the calling station, relay 5TC is restored to normal thereby removing ground from the trunk S conductor thus causing the release of relay 5S and the subsequent restoration to normal of trunk 5 and switching circuit 4 as hereinbefore described.

(2.10) *Light traffic operation*

The immediately preceding detailed description has concerned itself primarily with the detailed circuit operation involved during periods of heavy traffic as described in the above-mentioned Riddell application. In a stock quotation system of this type such periods of heavy traffic will of course be the rule rather than the exception. This section is concerned with the operation of the system, in accordance with our invention, during periods of light traffic which will occur at varying intervals during the course of a business day.

The light or heavy traffic condition of the system is ascertained by the operated or released condition of relay (HTR) in the marker circuit. The manner in which this detection takes place is described in detail in the Busch patent beginning therein in column 203, which is hereby made a part of this specification as though contained in detail herein. As set forth in the Busch patent, a light traffic condition is manifested by the released state of relay (HTR). Accordingly, referring to FIG. 8, ground is extended through (HTR–9) from marker circuit 11, via the TR lead to operate relay 8LTR in traffic control circuit 16.

We shall assume at this point that register circuit 6 has completed the forwarding of a four-digit stock code and the trunk identity to sender 8 as hereinbefore described. Digit register 701 and the trunk number register 702 in sender 8 may advantageously be arranged as well known in the art to provide a ground signal on lead SRL as an indication that these registers have received and registered the required information. This ground potential on the SRL lead is extended through released transfer contact 8SRL–1 so as to operate relay 8SRL in register 6. Relay 8SRL thereupon locks operated by an obvious circuit which extends through 5ON–9 to ground.

The enabling of make contact 8SRL–2 extends ground present on the LTR lead to operate relay 6CLA by an obvious circuit. We shall assume that thereafter the call progresses as hereinbefore described to the point where relay 5S1 is operated in trunk 5. The operation of make contact 5S1–8 provides an obvious locking path for relay 6CLA independent of the 8SRL–2 contact.

The subsequent release of register 6 causes the release of relay 8SRL via released make contact 5ON–9. Relay 6CLA remains operated through enabled make contact 5S1–8 which is under control of the calling station as hereinbefore described. Timing circuit 801 which may comprise a number of configurations well known in the art is thereupon enabled by a ground signal which extends through released break contact 5ON–8 and operated make contact 6CLA–3.

Circuit operation proceeds as hereinbefore described for heavy traffic operation thus resulting in register 6 being associated with the appearance formerly connected to trunk 5 and trunk 5 being associated with the apperance formerly used by register 6 for the dial tone connection. Upon completion of this transfer connection an audible message is returned to the calling station. However, it will be noted at this time that the released condition of transfer contact 8LTR–2 during heavy traffic normally provides a ground on the SM lead to computer 9 so as to enable short message control circuit 902 in a manner well known in the art. Thus for an enabled condition of short message control circuit 902, a message comprising only the mandatory information would be provided to the calling station. However, in the instant case by virtue of the prevailing light traffic condition, make contact 8LTR–2 is currently enabled. Accordingly, ground is extended over the LM lead to computer 9 thereby enabling long message control circuit 901. Computer 9 may be arranged as well known in the computer art to thereupon provide additional output information in predetermined categories in response to the dialed request. Therefore the message impressed on trunk 5 at this time will be longer in duration than that which is normally provided during heavy traffic.

Figure 8:
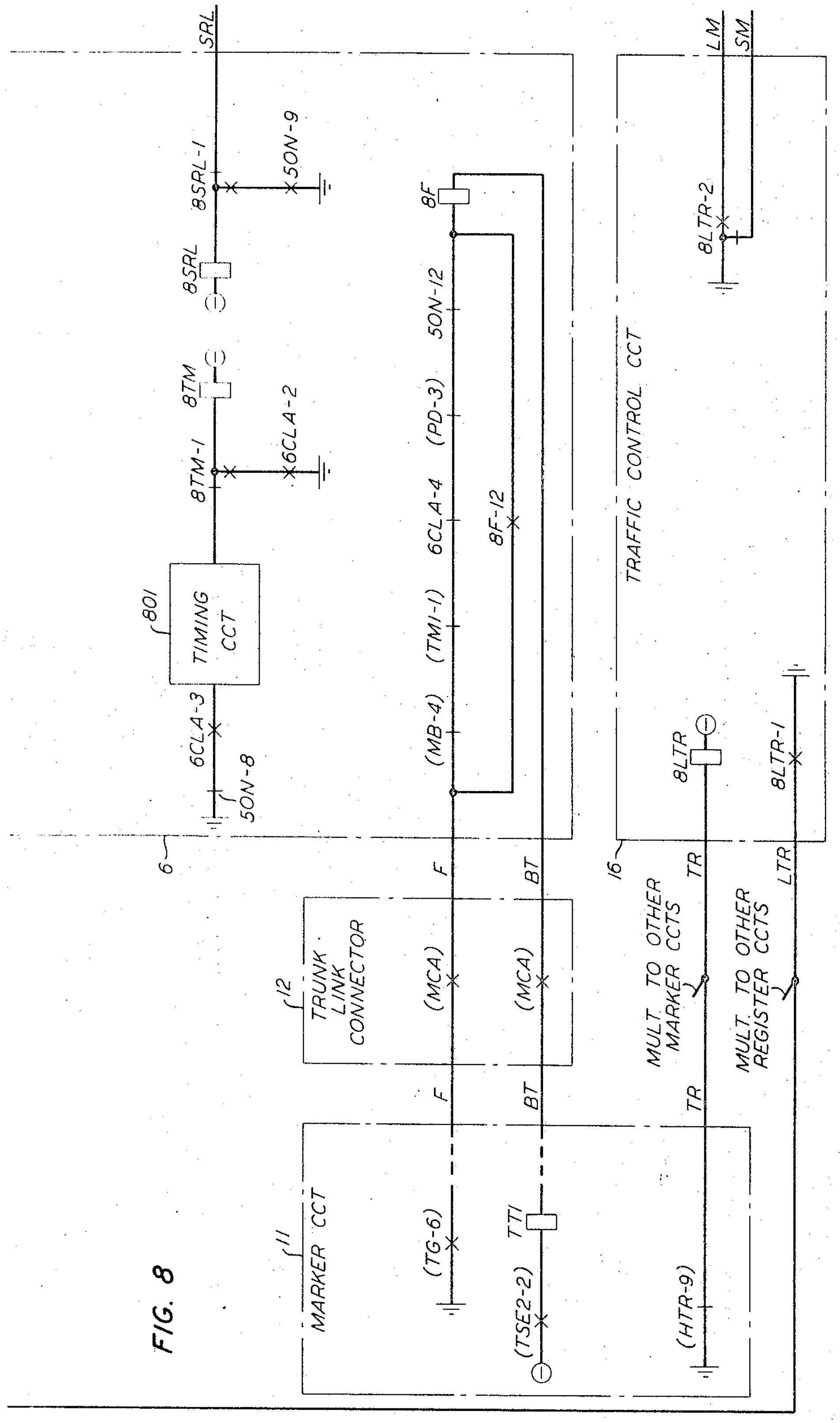
Figure 9:
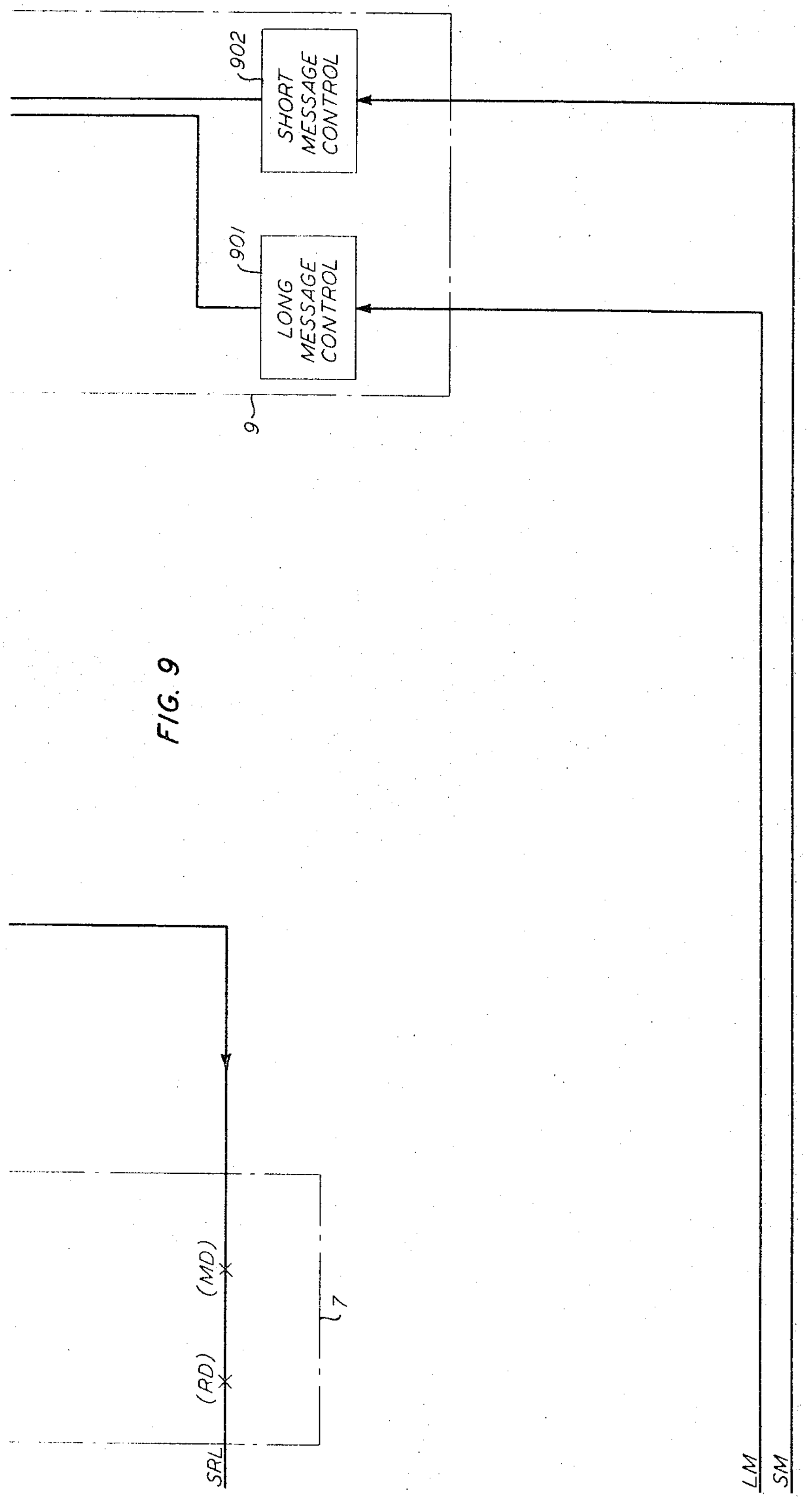

It will be noted that during the operated condition of relay 6CLA there is an absence of continuity between the F and BT leads as shown on FIG. 8 by virtue of enabled break contact 6CLA–4. Accordingly, an attempt to select register 6 at this time would be unavailing since the lack of continuity between the F and BT leads provides an indication of a busy condition of register 6 as explained in detail beginning in column 27 in the Busch patent. In the event the station connected to trunk 5 should abandon the call, relay 5S1 releases as hereinbefore described thus releasing relay 6CLA.

Assuming the call is not abandoned, after a predetermined interval of time, timing circuit 801 is operative to extend ground through released break contact 8TM–1 to energize relay 8TM in register 6. Accordingly, relay 8TM operates at this time and closes a locking path through 8TM–1 and 6CLA–2 to ground, independent of timing circuit 801. Operated break contact 8TM–2 thereupon opens the previously described locking path of relay 6CLA causing that relay to release. The release of relay 6CLA restores make contact 6CLA–3 to normal thereby disabling timing circuit 801. The release of break contact 6CLA–4 restores the continuity of the F and BT leads through register 6. Thus at this point in time, register 6 is available for reseizure as hereinbefore described.

If the light traffic condition is maintained for an extended interval, ground present on the LTR lead causes the subsequent reoperation of relay 6CLA upon completion of the register function. However, assuming a return to a heavy traffic period, contact HTR–9 is enabled. Thus ground will not be present on conductor LTR and the circuit operation will proceed as described in preceding sections.

(2.11) *Conclusion*

While the equipment of this invention has been described with reference to a particular embodiment in a telephone stock quotation system, it is to be understood that such an embodiment is intended merely to be illustrative of the present invention, and that numerous other arrangements may be devised by those skilled in the art without departing from the spirit and scope of the invention.

For example, the invention may be employed with an information source which is further arranged to return information in a plurality of categories such as time, weather, traffic, etc., as determined in each instance by the dialed request.

What is claimed is:

1. In a switching system,
a plurality of stations,
means for transmitting information to calling ones of said stations in response to requests from said stations,
means for detecting the rate of said requests and
means controlled by said detecting means for varying the amount of said information transmitted to each said calling station.

2. In a switching system,
the combination according to claim 1 wherein said varying means comprises means responsive to an increase in said rate of said requests for decreasing the amount of said transmitted information and
means responsive to a decrease in said rate of said requests for increasing the amount of said transmitted information.

3. In a switching system,
the combination according to claim 1 further comprising means for receiving information from calling ones of said stations and
timing means responsive to said detecting means for delaying the availability of said receiving means to said calling ones of said stations.

4. In a switching system,
a plurality of stations,
a source of information,
first control means for causing said information source to transmit messages of a predetermined time duration,
second control means for causing said information source to transmit messages of a second predeterminded time duration,
means for detecting the rate of requests from said stations to said information source, and
means controlled by said detecting means for enabling one of said first and second control means dependent on said rate of requests.

5. In a telephone system,
a switching network operable to complete calling connections, a plurality of appearances in said network arranged in groups of two,
a register and a trunk associated with one of said groups,
means for sequentially associating said register and said trunk individually with each of said appearances,
control means responsive to a predetermined rate of completion of said calling connections for increasing the interval of time said trunk is associated with either of said appearances, and
means for inhibiting the association of said register with the other of said appearances until a predetermined portion of said increased interval of time has elapsed.

6. The combination set forth in claim 5 wherein said control means further comprises means for decreasing the interval of time said trunk is associated with either of said appearances and
means for disabling said inhibiting means.

7. In a switching system,
a plurality of lines,
first and second appearances,
a register,
a trunk,
means for connecting a calling one of said lines to said register via said first appearance,
means for transferring the connection of said first line from said register to said trunk,
means operative in response to a predetermined rate of calling by others of said lines for delaying the connection of one of said other lines to said register via said second appearance for a predetermined interval of time, and
means operative upon disconnection of said first line for transferring the connection of said second line from said register to said trunk.

8. In a switching system,
the combination set forth in claim 7 and further comprising
an information source interposed between said register and said trunk,
means operative in response to the storage in said register of a request for information for activating said information source to transmit said requested information to said trunk, and
means operative in response to the enabling of said delaying means for transmitting additional information relevant to said request.

9. In a telephone system,
a trunk,
a register,
a pair of network appearances associated with said register and said trunk,
means for connecting said register and said trunk individually and in sequence to each of said appearances,
means operative in response to a predetermined traffic rate in said telephone system for varying the interval of time said trunk is connected to one of said appearances,
and means for blocking the connection of said register to said other appearance until a predetermined portion of said interval of time has elapsed.

10. In a switching system,
a plurality of stations,
a source of information operative to transmit information to calling ones of said stations in response to requests from said stations,
means for detecting the rate of said requests,
means controlled by said detecting means for increasing the amount of information transmitted to each calling station in response to a decrease in said request rate, and
means for decreasing the amount of information transmitted to each calling station in response to an increase in said request rate.

11. In a switching system,
a switching network,
a plurality of lines connected to said network,
a plurality of switching circuits each having a first and a second appearance in said network,
a plurality of trunks,
a plurality of registers each comprising indicating means and timing means,
control means responsive to each of said register indicating means for connecting a first one of said lines to an idle one of said registers via and first appearance of one of said switching circuits,
said one switching circuit comprising means for transferring said idle register to said second appearance and
means for transferring said trunk to said first appearance,
traffic control means comprising inhibiting means operative in response to a predetermined traffic rate in said system for inhibiting said idle register indicating means and
means for enabling said idle register timing means,
said timing means comprising means for disabling said inhibiting means after a predetermined interval of time,
said control means further comprising means responsive to said idle register indicating means for connecting a second one of said lines to said register via said second appearance prior to release of the connection of said first line to said trunk via said first appearance, and
said switching circuit further comprising means for connecting said associated trunk to said second appearance upon release of said connection of said first line to said trunk via said first appearance.

12. The combination set forth in claim 11 wherein said register indicating means comprises a test conductor normally connected to a source of potential,
said inhibiting means comprises first relay contact means serially connected in said test conductor, and
said timing means comprises a timing circuit and
second relay means controlled by said timing circuit for releasing said first relay contact means.

13. The combination set forth in claim 11 wherein said trunk comprises means for disabling said inhibiting means upon release of the connection of said first line to said trunk via said first appearance.

References Cited

UNITED STATES PATENTS

| | | | |
|---|---|---|---|
| 3,190,965 | 6/1965 | Zarouni | 179—18 |
| 3,281,789 | 10/1966 | Willcox | 340—152 |

BERNARD KONICK, *Primary Examiner.*

L. H. HILL, *Assistant Examiner.*